US009577967B2

(12) United States Patent
Xiang et al.

(10) Patent No.: US 9,577,967 B2
(45) Date of Patent: Feb. 21, 2017

(54) METHOD AND SYSTEM FOR MANAGING AN INFORMATIONAL SITE USING A SOCIAL NETWORKING APPLICATION

(71) Applicant: Tencent Technology (Shenzhen) Company Limited, Shenzhen (CN)

(72) Inventors: Guoyi Xiang, Shenzhen (CN); Zuoting Xiong, Shenzhen (CN); Hui Yan, Shenzhen (CN); Zishun Chen, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/191,347

(22) Filed: Jun. 23, 2016

(65) Prior Publication Data

US 2016/0330151 A1 Nov. 10, 2016

Related U.S. Application Data

(63) Continuation of application No. PCT/CN2015/071439, filed on Jan. 23, 2015.

(30) Foreign Application Priority Data

Apr. 2, 2014 (CN) .......................... 2014 1 0132132

(51) Int. Cl.
*G06F 15/16* (2006.01)
*H04L 12/58* (2006.01)
(Continued)

(52) U.S. Cl.
CPC ............. *H04L 51/046* (2013.01); *H04L 67/02* (2013.01); *H04L 67/26* (2013.01); *H04L 67/306* (2013.01); *H04W 4/206* (2013.01)

(58) Field of Classification Search
CPC ...... H04L 51/046; H04L 51/32; H04L 67/306; H04L 67/24; H04L 63/08
See application file for complete search history.

(56) References Cited

U.S. PATENT DOCUMENTS 6,684,369 B1 * 1/2004 Bernardo .............. G06F 17/211
707/E17.116
9,396,173 B2 * 7/2016 Tymoshenko .... G06F 17/30887
2012/0144003 A1 * 6/2012 Rosenbaum ........ G06F 17/3082
709/220

FOREIGN PATENT DOCUMENTS

CN         1996989 A      7/2007
CN       102185800 A      9/2011
(Continued)

OTHER PUBLICATIONS

Tencent Technology, ISRWO, PCT/CN2015/071439, Apr. 3, 2015, 8 pgs.

*Primary Examiner* — Yves Dalencourt
(74) *Attorney, Agent, or Firm* — Morgan, Lewis & Bockius LLP

(57) ABSTRACT

A computer server supporting a social networking application that has multiple users, each user having a unique social networking application account identifier, is used for generating and managing an informational site accessible to the multiple users. Upon receipt of an informational site establishment request from a first client device, the informational site establishment request including a social networking application account identifier of a user of the first client device, the computer server establishes, according to the informational site establishment request, an informational site corresponding to the social networking application account identifier. The computer server then publishes a link to the informational site to users associated with a plurality of social networking application account identifiers of the (Continued)

social networking application, enabling the users to access the informational site from their accounts of the social networking application in the form of instant message exchanges.

18 Claims, 6 Drawing Sheets

(51) Int. Cl.
*H04L 29/08* (2006.01)
*H04W 4/20* (2009.01)

(56) References Cited

FOREIGN PATENT DOCUMENTS

| CN | 102298625 A | 12/2011 |
|----|-------------|---------|
| CN | 102595211 A | 7/2012  |
| CN | 103607427 A | 2/2014  |

* cited by examiner

METHOD AND SYSTEM FOR MANAGING AN INFORMATIONAL SITE USING A SOCIAL NETWORKING APPLICATION

RELATED APPLICATIONS

This application is a continuation application of PCT Patent Application No. PCT/CN2015/071439, entitled "METHOD AND SYSTEM FOR MANAGING AN INFORMATIONAL SITE USING A SOCIAL NETWORKING APPLICATION" filed on Jan. 23, 2015, which claims priority to Chinese Patent Application No. 201410132132.X, entitled "METHOD AND SYSTEM FOR ESTABLISHING SOCIAL NETWORKING APPLICATION-BASED INFORMATIONAL SITE" filed on Apr. 2, 2014, both of which are incorporated by reference in their entirety

TECHNICAL FIELD

The present application relates to the field of instant mobile communications technologies, and in particular, to method and system for managing an informational site using a social networking application.

BACKGROUND

With the extensive development of smart phones and tablet computers, the mobile Internet has a wide user basis. Mobile social networking application becomes a critical application of the mobile Internet and has a large number of users. With the user of the mobile social networking application as a target, information releasing, marketing, media propagation, simple interactions on the target already become an important way of applications such as marketing and information releasing. When information releasing is performed through a mobile social networking application, a public account often needs to be registered, and information releasing, business marketing, brand promotion, and the like are performed by using the public account. However, on a mobile social networking platform, if it is required to establish a mobile social networking site on a public account of a social networking application and use the mobile social networking site, an end user is required to have its own server or a virtual machine, a library name, bandwidth, and even hardware devices for providing backend services such as a database, and is also required to design, develop, and test programs for the mobile social networking site, and then file an application and establish a connection to a mobile social networking platform, which is a complicated informational site establishment process and requires large investment.

SUMMARY

The above deficiencies and other problems associated with establishing a mobile social networking informational site are reduced or eliminated by the present application disclosed below. In some embodiments, the present application is implemented in a computer system that has one or more processors, memory and one or more modules, programs or sets of instructions stored in the memory for performing multiple functions. Instructions for performing these functions may be included in a computer program product configured for execution by one or more processors.

In accordance with some embodiments of the present application, a method of managing an informational site using a social networking application that has multiple users, each user having a unique social networking application account identifier, is performed at a computer system having one or more processors and memory for storing program modules to be executed by the processors. The method includes: receiving an informational site establishment request from a first client device, the informational site establishment request including a social networking application account identifier of a user of the first client device; establishing, according to the informational site establishment request, an informational site corresponding to the social networking application account identifier; and publishing a link to the informational site to users associated with a plurality of social networking application account identifiers of the social networking application to enable the users to access the informational site from their accounts of the social networking application. In accordance with some embodiments of the present application, a computer system includes one or more processors; memory; and one or program modules stored in the memory for performing the method mentioned above. In accordance with some embodiments of the present application, a non-transitory computer readable storage medium stores one or more program modules configured for execution by a computer system that includes one or more processors and memory for performing the method mentioned above.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The solutions of the present application are described in detail with reference to preferred implementation manners. In the following description, embodiments of a social networking application-based informational site establishment method of the present application are described first, and then an embodiment of a social networking application-based informational site establishment system of the present application is described.

According to the social networking application-based informational site establishment method of the present application, the establishment of a social networking application-based informational site is implemented in a manner related to the operation of a social networking application platform. In a specific implementation, the informational site establishment may be performed based on information interaction between a client device and a server (which is called a social networking application server in the present application). Description is separately made in the following examples, and such description is not intended to limit solutions of the present application.

Figure 1:
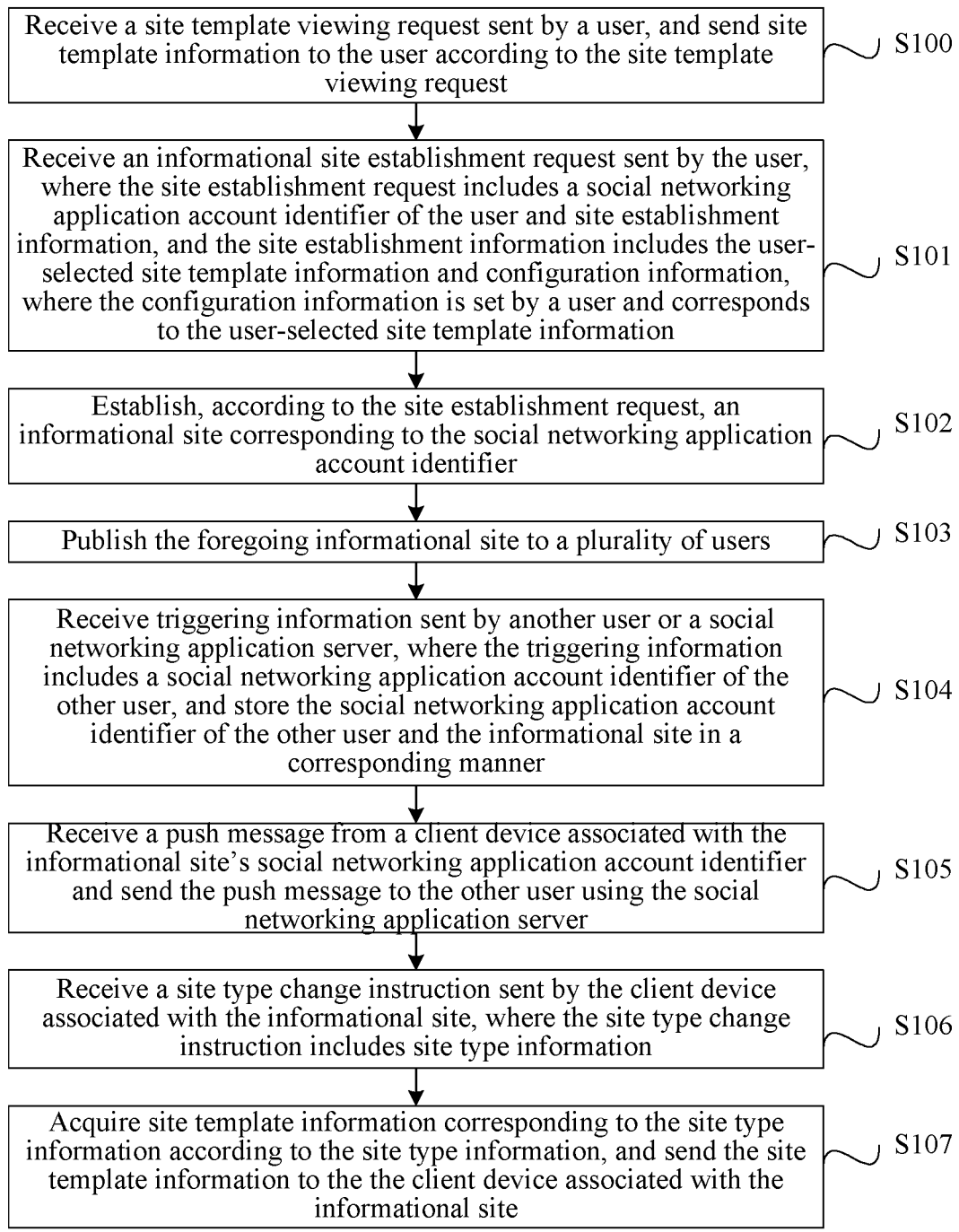
FIG. 1 is a schematic flowchart of a social networking application-based informational site establishment method according to Embodiment 1 of the present application.

FIG. 1 is a schematic flowchart of a social networking application-based informational site establishment method in accordance with some embodiments of the present application. As shown in FIG. 1, description is made by using a process in which an informational site is established on a social networking application server as an example. As shown in FIG. 1, the method in this embodiment includes the following steps:

Step S101: Receive an informational site establishment request sent by a user from a client device, where the informational site establishment request includes a social networking application account identifier of the user of the client device and informational site establishment information, and the informational site establishment information includes the user-selected site template information and configuration information, where the configuration information is set by the user of the client device and corresponds to the user-selected site template information. In some embodiments, the configuration information includes a plurality of social networking application account identifiers such that the established informational site is only accessible to users of the plurality of social networking application account identifiers.

Step S102: Establish, according to the informational site establishment request, an informational site corresponding to the social networking application account identifier. In some embodiments, a message log entry is generated between the social networking application account identifier and each of the plurality of social networking application account identifiers. The message log entry is used for tracking access of the informational site by users associated with the plurality of social networking application account identifiers and messages exchanged between the informational site and the users associated with the plurality of social networking application account identifiers.

Step S103: Publish the foregoing informational site to the users associated with the plurality of social networking application account identifiers. In some embodiments, the foregoing informational site is initially accessible to only the users associated with the plurality of social networking application account identifiers in the configuration information. The users are alerted of the existence of the informational site by receiving an instant message on their mobile devices.

According to the foregoing solution of the embodiment of the present application, the establishment of a social networking application-based informational site is implemented in a manner related to the operation of a social networking application platform. When an informational site establishment request is received, site template information in the informational site establishment request is directly bound to a social networking application user, thereby establishing an informational site corresponding to a social networking application account identifier. As such, the social networking application-based informational site establishment may be implemented by only configuring the site template information without independently designing, developing, and testing programs; and this informational site establishment manner is convenient and low in cost.

For the foregoing social networking application account identifier, any possible social networking application account identifier may be used; in one specific implementation manner, the foregoing social networking application account identifier may be a public account of a social networking application platform, so as to provide a mobile social networking application service.

As shown in FIG. 1, in a specific example of the present application, before Step S101, the method may further include the following step:

Step S100: Receive a site template viewing request sent by a user of the client device, and send site template information to the client device according to the site template viewing request. In some embodiments, the site template information includes a set of pre-designed site template configurations, each configuration having an associated service type.

Therefore, a user planning to establish a social networking application-based informational site is only required to view corresponding site template information, select a desired site template according to a service type demand, and based on this, and configure relevant information of the site template; the user is not required to write and test program code of the informational site, which is convenient and reduces cost.

After the foregoing social networking application-based informational site is published, user-triggered information can be implemented. Therefore, in one specific example, as shown in FIG. 1, the embodiment of the present application may further include the following step:

Step S104: Receive triggering information sent by another client device via a social networking application server, where the triggering information includes the social networking application account identifier of a user of the other client device and the informational site, and store the social networking application account identifier of the user of the other client device and the informational site in a corresponding manner. In some embodiments, the triggering information is in the form of an instant message from the user of the other device to the informational site's social networking application account identifier. Upon receipt of the instant message, it is determined whether there is an existing message log entry between the user of the other device and the informational site's social networking application account identifier. The existence of such message log entry indicates that the user of the other device has been chosen or registered to be a recipient of information serviced by the informational site. Future communications between the informational site and the user of the other client device will be recorded in the corresponding message log entry. The non-existence of such message log entry indicates that the user of the other device has not been chosen or registered to be a target serviced by the informational site. If so, a new instant messaging entry may be generated for tracking future communications between the informational site and the user of the other client device. This happens when the user of the other client device receives an instant message including a link to the informational site forwarded from another user that has received the instant message on his/her social networking application. When this happens, the user may automatically or manually register with the social networking application for receiving future communications from the informational site. In other words, the informational site in accordance with some embodiments of the present application is only available to a selected group of users of a social networking application platform by keeping track of social networking application users that have been allowed to exchange instant messages with the informational site via the social networking application server.

Therefore, the triggering of a subscription relationship between users of the social networking application and the informational site of the present application may be implemented based on an instant message sent to the informational site from the users in the form of, for example, a first-time following message, an automatic reply message, a keyword reply message, a user-defined menu reply message, and the like. After being triggered by triggering information of the other client device, the informational site can send push messages to the client devices associated with the users in the future.

As shown in FIG. 1, a process of sending a push message may be described as follows:

Step S105: Receive a push message from a client device associated with the informational site's social networking application account identifier and send the push message to the user of the other client device using the social networking application server.

When the push message is sent to the other client device, the push message is sent to all other client devices that have triggered the informational site, or the push message is sent to a subset of the other client devices that have triggered the informational site. In some embodiments, the subset of the other client devices are selected by the push message itself. For example, the push message includes a list of social networking application identifiers pre-selected by the user of the client device that sends the push message. Alternatively, the push message may specify user-defined criteria for the subset of the other client devices. For example, the criteria may be that the push message be sent to those users that haven't accessed the informational site for a predefined period time or that the push message be sent to those users that have submitted a keyword reply message including one or more predefined keywords associated with the push message.

In a case in which the push message is sent to all the other client devices that have triggered the informational site, the push messages may be sent by using the following manner: receiving the push message sent by the client device associated with the informational site's social networking application account identifier, and sending, according to a correspondence relationship between the stored social networking application account identifiers of the other client device and the informational site, the push message to all the other client devices corresponding to the informational site. In another example, the social networking application server may send the push message in the form of an instant message to the other client devices.

In a case in which the push message is only sent to a portion of the other client devices, the push message may be sent by using the following manner: receiving the push message sent by the client device associated with the informational site's social networking application account identifier, where the push message includes the social networking application account identifier of the user of the other client device, and sending the push message to the other client device. In another implementation manner, the social networking application server may also send the push message to the other client device in the form of an instant message. In addition, in a process in which a social networking application-based informational site in the present application is applied, according to application demands, a type of the social networking application may need to be changed; for example, a type of the social networking application is changed from a subscription number providing information and consultation to a service number providing a service. At this time, it may be required to adaptively modify relevant information of a site corresponding to the social networking application. Therefore, in a specific example, the method according to the embodiment of the present application may further include the following steps:

Step S106: Receive a site type change instruction sent by the client device associated with the informational site, where the site type change instruction includes site type information.

Step S107: Acquire site template information corresponding to the site type information according to the site type information, and send the site template information to the client device associated with the informational site.

Therefore, according to the solution of the embodiment of the present application, when a site type needs to be changed, there is no need to rewrite or debug the program supporting the informational site for a new type, and it is only required to select a corresponding site template according to a new site type and perform corresponding configuration, which is convenient and low in cost.

Figure 2:
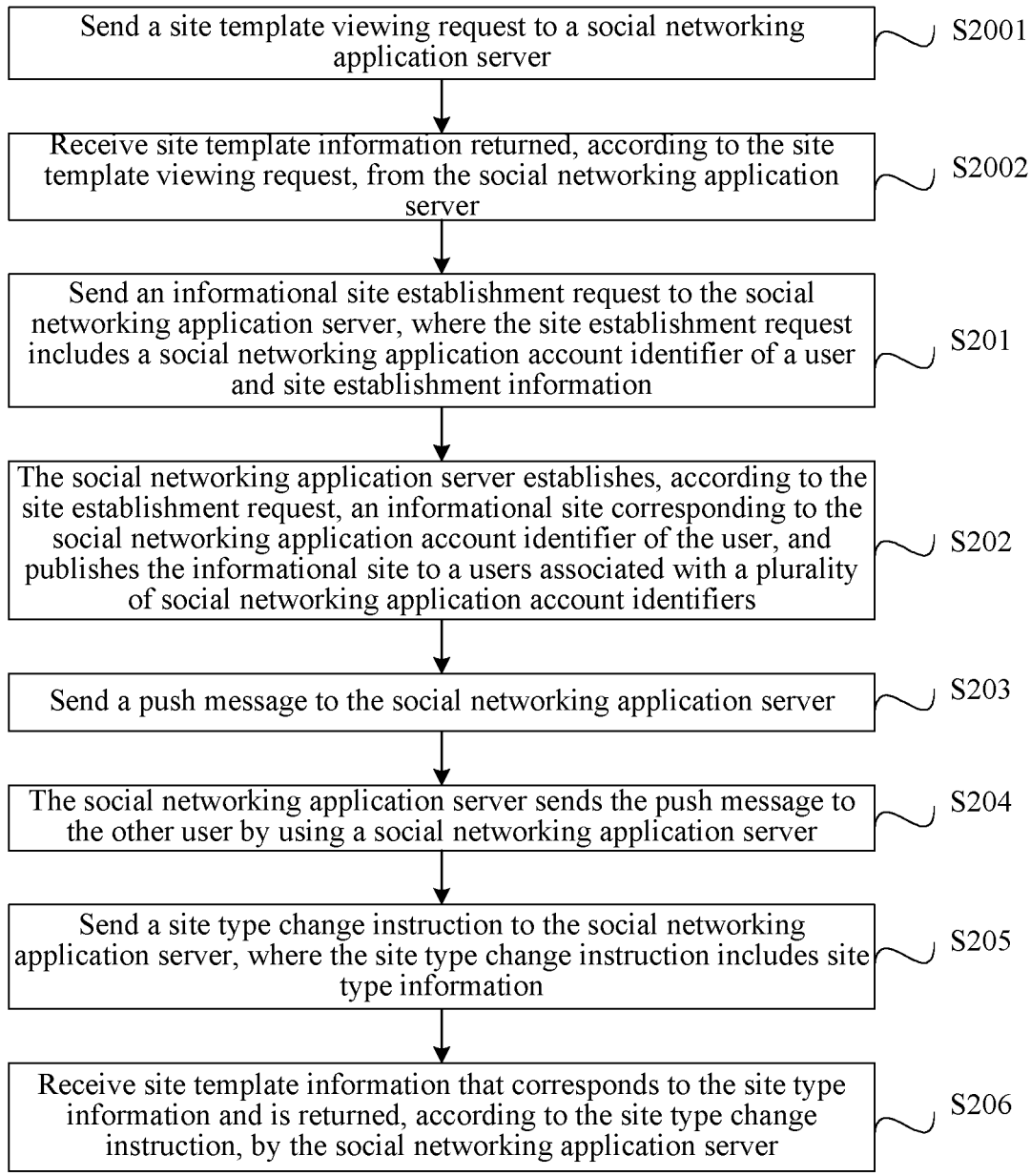
FIG. 2 is a schematic flowchart of a social networking application-based informational site establishment method according to Embodiment 2 of the present application.

FIG. 2 is a schematic flowchart of Embodiment 2 of a social networking application-based informational site establishment method in accordance with some embodiments of the present application. As shown in FIG. 2, description is made from the perspective a client device needing to establish an informational site using a social networking application. As shown in FIG. 2, the method in this embodiment includes the following steps:

Step S201: Send an informational site establishment request to the social networking application server, where the informational site establishment request includes a social networking application account identifier of a user of a client device and informational site establishment information, and the informational site establishment information includes site template information and configuration information, where the configuration information is set by the user of the client device and corresponds to the site template information. In some embodiments, the configuration information includes a plurality of social networking application account identifiers such that the established informational site is only accessible to users of the plurality of social networking application account identifiers.

Step S202: The social networking application server establishes, according to the informational site establishment request, an informational site corresponding to the social networking application account identifier of the user of the client device, and publishes the informational site to the users associated with the plurality of social networking application account identifiers. In some embodiments, the foregoing informational site is initially accessible to only the users associated with the plurality of social networking application account identifiers in the configuration information. The users are alerted of the existence of the informational site by receiving an instant message on their mobile devices.

According to the solution of the embodiment of the present application, for the client device, the client device only needs to send an informational site establishment request including site template information, configuration information corresponding to the site template information, and social networking application account identifier of the user of the client device to the social networking application server, and the social networking application server can establish an informational site corresponding to the social networking application account identifier according to the informational site establishment request; as such, social networking application-based informational site establishment may be implemented by only configuring the site template information without independently designing, developing, and testing programs by the client; and the informational site establishment manner is convenient and low in cost.

For the foregoing social networking application account identifier, any possible social networking application account identifier may be used; in one specific implementation manner, the foregoing social networking application account identifier may be a public account of a social networking application platform, so as to provide a social networking application service.

As shown in FIG. 2, in a specific example of the present application, before Step S201, the method may further include the following steps:

Step S2001: Send a site template viewing request to the social networking application server.

Step S2002: Receive site template information returned, according to the site template viewing request, from the social networking application server. In some embodiments, the site template information includes a set of pre-designed site template configurations, each configuration having an associated service type.

Therefore, a client device needing to establish a social networking application-based informational site is only required to view corresponding site template information, select a desired site template according to a service type demand, and based on this, and configure relevant information of the site template; the client is not required to write and test program code of the informational site, which is convenient and low in cost.

After the foregoing social networking application-based informational site is published, user-triggered information can be implemented. When triggering is performed, triggering information of a user of the other client device may be directly sent to the informational site of the present application, or may also be sent to the informational site of the present application by using a social networking application server; and the triggering information includes social networking application account identifier of the user of the other client device and information of the informational site.

After receiving the triggering information, the informational site stores a correspondence relationship between the social networking application account identifiers of the user of the other client device and the informational site.

The triggering information may be implemented based on an instant message sent to the informational site from the users in the form of, for example, a first-time following message, an automatic reply message, a keyword reply message, a user-defined menu reply message, and the like. After being triggered by triggering information of the other client device, the informational site can send push messages to the client devices associated with the users in the future.

Therefore, as shown in FIG. 2, in a specific example of the present application, the method may further include the following steps:

Step S203: Send a push message to the social networking application server.

Step S204: The social networking application server sends the push message to the other client device.

When the push message is sent to the other client device, the push message is sent to all other client devices that have triggered the informational site, or the push message is sent to a subset of the other client devices that have triggered the informational site.

Therefore, when the push message is sent to all the other client devices, a process in a specific example may be described as follows:

The client sends the push message to the social networking application server; after receiving the push message, the social networking application server sends the push message to all the other client devices corresponding to the informational sites according to a correspondence relationship between the stored social networking application account identifiers of the other client devices and the informational site. In another example, the social networking application server may send the push message in the form of an instant message to the other client devices.

In a case in which the push message is sent to a portion of the other client devices, the push message may be sent by using the following manner:

The client sends the push message to the social networking application server, where the push message includes the social networking application account identifier of a user of the other client device; after receiving the push message, the social networking application server sends the push message to the other client device corresponding to the push message. In another example, the social networking application server may also send the push message to the other client device in the form of an instant message.

In addition, in a process in which a social networking application-based informational site in the present application is applied, according to application demands, a type of the social networking application may need to be changed; for example, a type of the social networking application is changed from a subscription number providing information and consultation to a service number providing a service. At this time, it may be required to adaptively modify relevant information of a site corresponding to the social networking application. Therefore, in a specific example, the method according to the embodiment of the present application may further include the following steps:

Step S205: Send a site type change instruction to the social networking application server, where the site type change instruction includes site type information.

Step S206: Receive site template information that corresponds to the site type information and is returned, according to the site type change instruction, by the social networking application server.

After receiving the site template information returned by the social networking application server, the client can reselect site template information that is used, and perform corresponding configuration on the site template information, so as to modify relevant information of a site. Therefore, according to the solution of the embodiment of the present application, when a site type needs to be changed, there is no need to rewrite or debug the program supporting the informational site for a new type, and it is only required to select a corresponding site template according to a new site type and perform corresponding configuration, which is convenient and low in cost.

According to the foregoing solution of the present application, description is made in detail with reference to an interaction process of two specific examples.

Figure 3:
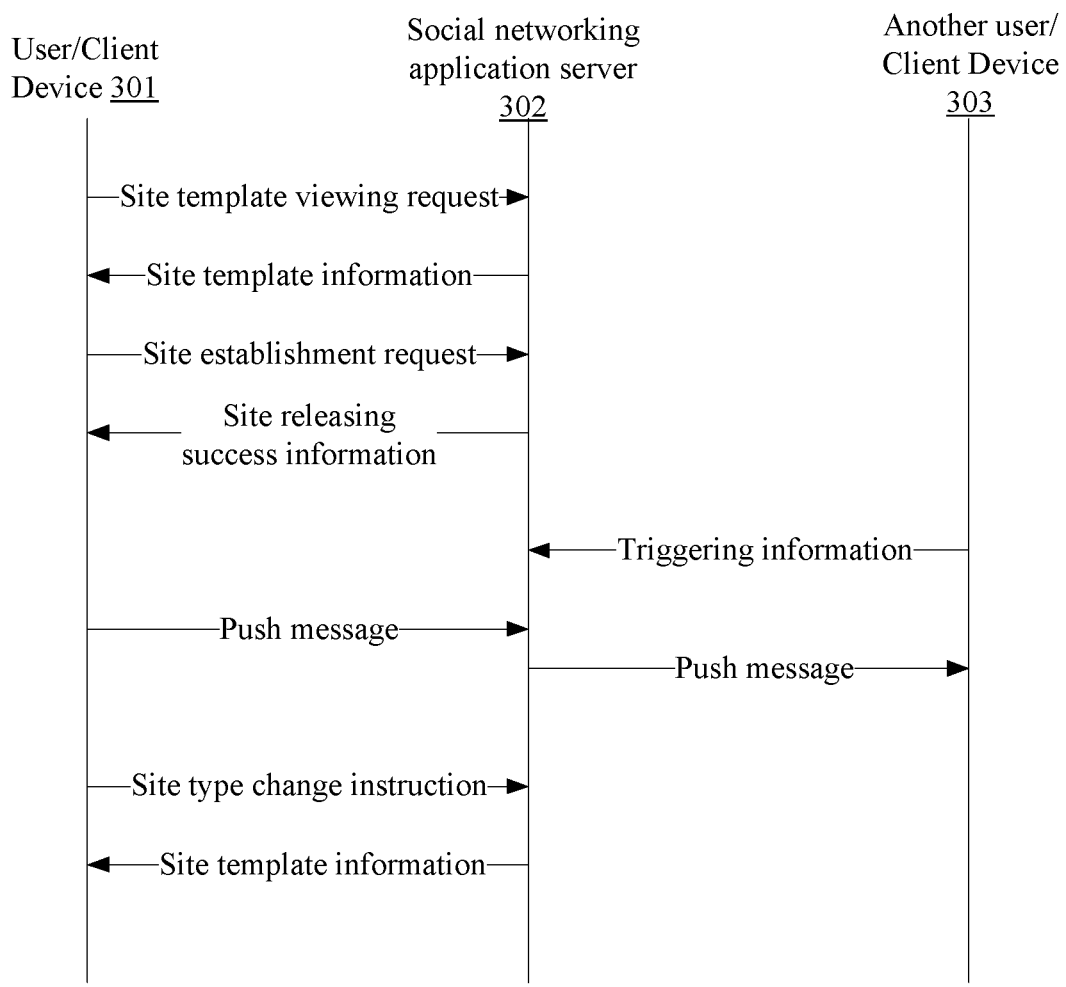
FIG. 3 is a schematic diagram of an interaction process in a specific example in accordance with some embodiments of the present application.
Figure 4:
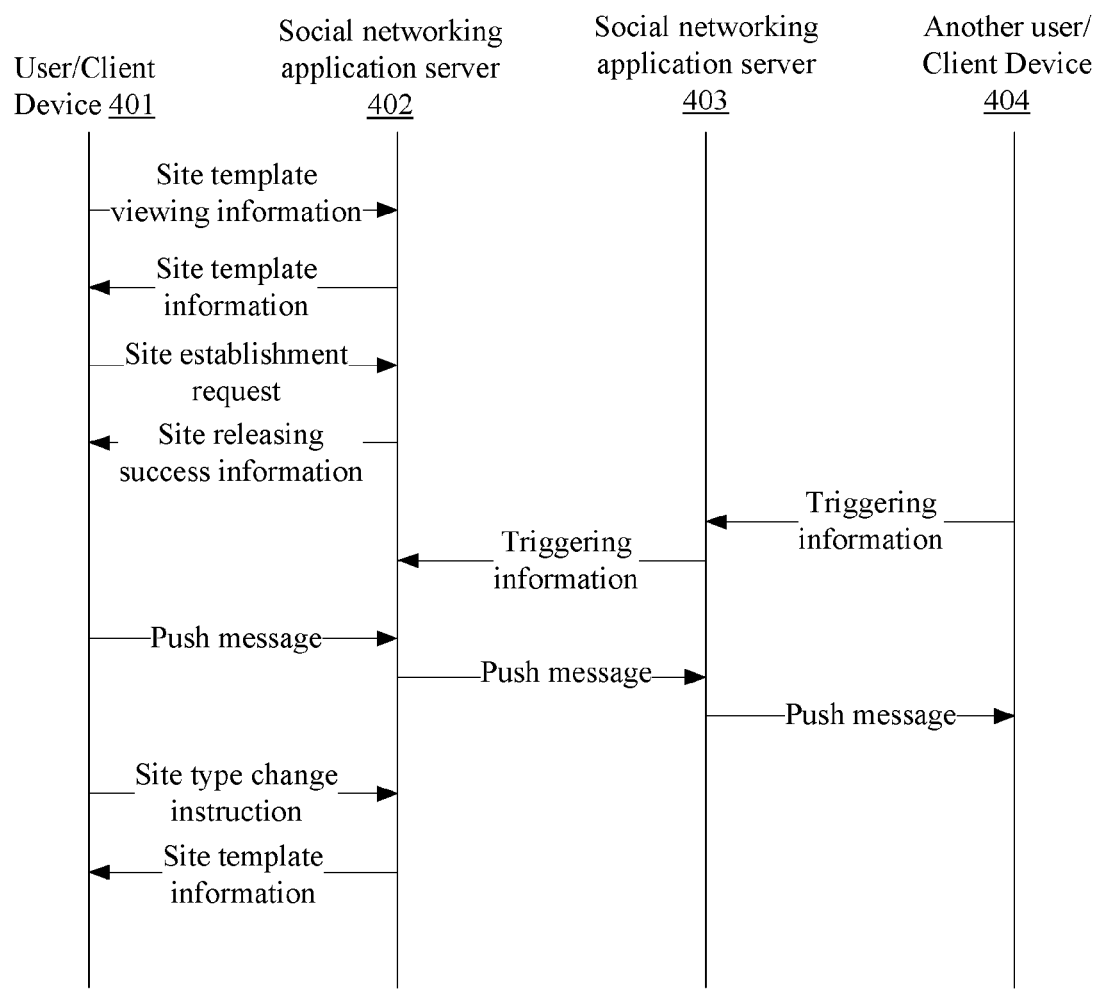
FIG. 4 is a schematic diagram of an interaction process in another specific example in accordance with some embodiments of the present application.

Refer to FIG. 3 and FIG. 4, which are schematic diagrams of interaction processes in specific examples respectively. As shown in FIG. 3, description is made by using an example in which an interaction of triggering information and a push message is directly performed between a user of a client device 301 associated with the informational site, a social networking application server 302, and a user of another client device 303. As shown in FIG. 4, description is made by using an example in which interaction of triggering information and a push message is directly performed between a user of a client device 401 associated with the informational site, two social networking application servers 402 and 403, and a user of another client device 404.

Referring to FIG. 3 and FIG. 4, when a user needs to establish a social networking application-based informational site, the user sends site template viewing request to a social networking application server by using a client device that is used by the user.

After receiving the site template viewing request, the social networking application server acquires various informational site templates that are set, and sends the site template information to the client device for the user to choose. The template that can be provided to the client device in the solution of the present application may include various templates about a social networking application, and these informational site templates may be different in terms of industries and functions for the user of the client device to screen. It is known by persons skilled in the art that, information included in the informational site templates of different types may be different according to site types and needed functions; therefore, relevant information of the site templates is not described herein. In addition, in a specific example, when a template is returned to the client device, it may be that the template is sent to the client device according to the site template information arranged according to an index such as browsing popularity or a user rate.

After receiving the site template information, the client device displays a received informational site template, and a user may view the informational site template displayed by the client device, so as to select an informational site template in which the user is interested. After selecting an informational site template in which the user is interested or which needs to be used by the user, the user may send a template selection request to the social networking application server by clicking corresponding buttons with similar functions such as "use", "confirm", and "select".

After receiving the template selection request, the social networking application server may return a login page to the client device, so as to enable the user of the client device to log in, so that the user stores the configuration information corresponding to the informational site template. Definitely, the user of the client device may also log in upon accessing the social networking application server, and in the case, it is possible that the social networking application server does not return the login page to the client device and can directly enter a subsequent process.

The user of the client device inputs relevant login information on a login page returned by the social networking application server, and sends a login request to the social networking application server by clicking buttons with similar functions such as "confirm" and "login", where the login request may include user name information and a corresponding password. After receiving the login information, the social networking application server compares the login information and stored user information, determines, according to a comparison result, whether the user is allowed to log in, and if the comparison fails, returns login failure information to the client. If the comparison succeeds, enter a subsequent process.

In a case in which the user of the client device has logged into his/her account in advance and sent the template selection request to the social networking application server, or in a case in which the user of the client sends the template selection request to the social networking application server in advance and subsequently logs in successfully, the social networking application server returns, to the client device, a template configuration page corresponding to the site template information in the template selection request, the user of the client configures corresponding configuration information in the template configuration page, and the user of the client device may configure relevant information in the template according to demands of the user. In a specific example, the social networking application server may preset relevant default filler data for relevant configuration information in the template, so that when the user of the client makes performs configuration, the user of the client makes modifications based on the default filler data.

After completing the configuration of relevant configuration information of the informational site template, the user of the client device may send a preview request to the social networking application server by clicking a button, such as "preview", and the preview request includes informational site template information and configuration information corresponding to the template. After receiving the preview request, the social networking application server determines a corresponding preview interface according to the preview request, and sends the preview result to the client device, so as to display the preview result in the client device, so that the user of the client device may modify or adjust the configuration information based on the preview result.

After the user of the client views the preview result, if the preview result is an expected result, enter a specific releasing step. During releasing, the client sends an informational site establishment request to the social networking application server, where the informational site establishment request includes a social networking application account identifier of the user of the client device and informational site establishment information, and the informational site establishment information includes site template information selected above and configuration information, where the configuration information is set and corresponds to the site template information.

After receiving the informational site establishment request, the social networking application server binds the informational site establishment information and the social networking application account identifier, and establishes an informational site corresponding to the social networking application account identifier; and after the binding succeeds, a social networking application-based informational site is published. After being published successfully, the informational site may receive triggering of a user of a common social networking application platform, and after the triggering succeeds, triggering information can be sent to an associated target.

A manner of triggering the social networking application-based informational site may be in the form of a first-time following message, an automatic reply message or a keyword reply message of the user of the other client device for the informational site. In a case in which the other client device performs a triggering operation such as using a first-time following message, an automatic reply message, or a keyword reply message on the informational site, the other client device may send triggering information.

In a specific example, as shown in FIG. 3, the triggering information of the triggering operation may be directly sent by the other client device to the social networking application server. In another specific example, as shown in FIG. 4, the triggering information of the triggering operation may be sent by the other client device 404 to the social networking application server 403, and the social networking application server 403 receives the triggering information from the social networking application server 402.

After receiving the triggering information, the social networking application server 402 stores a correspondence relationship between the social networking application account identifiers of the user of the other client device and the informational site.

After the other client device triggers the social networking application-based informational site, the client device associated with the informational site may send a push message to the other client device via the social networking application server.

In a specific example, as shown in FIG. 3, the push message may be directly sent by the social networking application server 302 to the other client device 303. In another specific example, as shown in FIG. 4, the push message may be sent by the social networking application server 402 to the social networking application server 403, and the social networking application server 403 sends the push message to the corresponding other client device 404.

Figure 5:
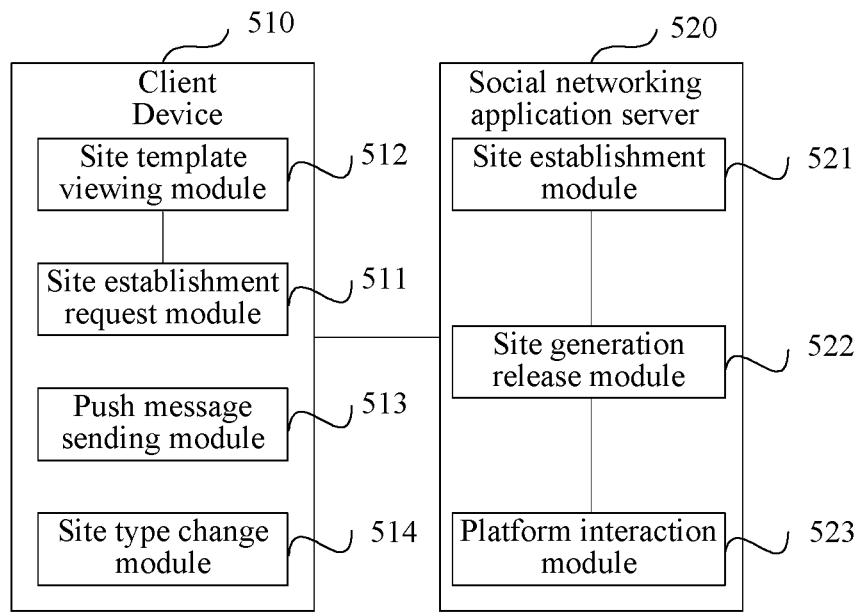
FIG. 5 is a schematic structural diagram of an embodiment of a social networking application-based informational site establishment system in accordance with some embodiments of the present application.

According to the method in the foregoing embodiment of the present application, the embodiment of the present application further provides a social networking application-based informational site establishment system. FIG. 5 is a schematic structural diagram of a system embodiment in accordance with some embodiments of the present application. A social networking application-based informational site establishment system in accordance with some embodiments of the present application may only include a client device, or may also only include a social networking application server, or may also include a client device and a social networking application server at the same time. For ease of description, as shown in FIG. 5, description is made by using an example in which the client device 510 and the social networking application server 520 are included at the same time, and such description is not intended to limit the solution of the present application.

As shown in FIG. 5, the system of the embodiment of the present application includes a client device 510 and a social networking application server 520.

The client device 510 includes: an informational site establishment request module 511, used for sending an informational site establishment request to the social networking application server 520, where the informational site establishment request includes informational site establishment information and a social networking application account identifier of the user of the client device, the social networking application server 520 establishes, according to the informational site establishment request, an informational site corresponding to the social networking application account identifier of the user of the client device, and publishes the informational site, and the informational site establishment information includes site template information and configuration information, where the configuration information is set by a user and corresponds to the site template information.

The social networking application server 520 includes: an informational site establishment module 521, used for receiving an informational site establishment request sent by the client device 510, where the informational site establishment request includes the social networking application account identifier of the user of the client device and the informational site establishment information, and the informational site establishment information includes the site template information and the configuration information, where the configuration information includes a plurality of social networking application account identifiers of users that have been granted access to the information site and is set by the user and corresponds to the site template information; and a site generation release module 522, used for establishing, according to the informational site establishment request, an informational site corresponding to the social networking application account identifier, and releasing the informational site.

According to the foregoing solution of the embodiment of the present application, the establishment of a social networking application-based informational site is implemented in a manner related to the operation of a social networking application platform; when an informational site establishment request is received, site template information in the informational site establishment request is directly bound to a social networking application user account identifier, thereby establishing an informational site corresponding to the social networking application account identifier; as such, social networking application-based informational site establishment may be implemented by only configuring the site template information without independently designing, developing, and testing programs; and this informational site establishment manner is convenient and low in cost.

For the foregoing social networking application account identifier, any possible social networking application account identifier may be used; in one specific implementation manner, the foregoing social networking application account identifier may be a public account of a social networking application platform, so as to provide a social networking application service.

In a specific example, as shown in FIG. 5, the client device 510 may further include: a site template viewing module 512, used for sending site template viewing request to the social networking application server 520, and receiving site template information returned, according to the site template viewing request, by the social networking application server 520.

Correspondingly, an informational site establishment module 521 of the social networking application server 520 is further used for receiving the site template viewing request sent by the client device, and sending the site template information to the client device according to the site template viewing request.

Therefore, a client device needing to establish a social networking application-based informational site is only required to view corresponding site template information, select a desired site template according to a service type demand, and based on this, and configure relevant information of the site template; the client is not required to write and test program code of the informational site, which is convenient and low in cost.

After the foregoing social networking application-based informational site is published, triggering of user information and pushing of messages can be implemented. Therefore, in a specific example, as shown in FIG. 5, the social networking application server 520 may further include: a platform interaction module 523, used for receiving triggering information sent by the other client device via the social networking application server, where the triggering information includes social networking application account identifier of the other client device, and storing the social networking application account identifier of the user of the other client device and the informational site in a corresponding manner.

Therefore, according to the triggering information, triggering of the informational site of the present application may be implemented, and the triggering information may be different based on actual requirements, and is, for example, a first-time following message, an automatic reply message, a keyword reply message, a user-defined menu reply message, and the like. After being triggered by triggering information of the other client device, the informational site can send a push message to the other client device. Therefore, as shown in FIG. 5, the client device 510 may further include a push message sending module 513.

In a specific example, the push message sending module 513 is used for sending a push message to the social networking application server 520, where the social networking application server 520 sends the push message to the other client device by using the social networking application server according to a correspondence relationship between the stored social networking application account identifiers of the other client device and the informational site.

Correspondingly, the platform interaction module 523 is further used for receiving the push message sent by the client device 510 associated with the informational site's social networking application account identifier, and sending the push message to the other client device by using the social networking application server according to the stored correspondence relationship between the social networking application account identifier of the user of the other client device and the informational site. In some embodiments, the correspondence relationship is related to a message log entry between the informational site and each of the plurality of social networking application account identifiers of users that have been granted access to the information site.

In another specific example, the push message sending module 513 is used for sending the push message to the social networking application server 520, where the push message includes the social networking application account identifier of the user of the other client device, and the social networking application server 520 sends the push message to the other client device.

Correspondingly, the platform interaction module 523 is further used for receiving the push message sent by the client device 510 associated with the informational site's social networking application account identifier, where the push message includes the social networking application account identifier of the user of the other client device, and sending the push message to the other client device.

In addition, in a process in which a social networking application-based informational site in the present application is applied, according to application demands, a type of the social networking application may need to be changed; for example, a type of the social networking application is changed from a subscription number providing information and consultation to a service number providing a service. At this time, it may be required to adaptively modify relevant information of a site corresponding to the social networking application.

Therefore, in a specific example, as shown in FIG. 5, the client device 510 may further include a site type change module 514, used for sending a site type change instruction to the social networking application server, where the site type change instruction includes site type information, and receiving site template information that corresponds to the site type information and is returned, according to the site type change instruction, by the social networking application server.

Correspondingly, the informational site establishment module 521 is further used for receiving the site type change instruction sent by the client device 510, where the site type change instruction includes site type information, acquiring the site template information corresponding to the site type information according to the site type information, and sending the site template information to the client.

In a specific example, the system of the present application may further include a storage device, where the storage device may be a common database, so as to store relevant information, such as relevant information data of an informational site, a correspondence between the informational site and the other client device, triggering information, and a push message, in a process in which the informational site is applied. In another implementation manner, the information may also be stored in a cloud storage device, so as to ensure security of the data.

Persons of ordinary skill in the art may understand that all or a part of the steps of the method according to the embodiments of the present application may be implemented by a computer program instructing relevant hardware. The program may be stored in a computer readable storage medium. When the program is run, the steps of the method according to the embodiments are performed. The storage medium may be a magnetic disk, an optical disc, a read-only memory (ROM), a random access memory (RAM), or the like. Therefore, according to the solutions of the embodiments of the present application, the present application further provides a storage medium including a computer readable program. When the computer readable program in the storage medium is run, it may implement the social networking application-based informational site establishment method of the present application in any one of the foregoing manners.

The method according to the embodiments of the present application described above may be installed on a corresponding machine device in a form of software, and implement the social networking application-based informational site establishment process by controlling a relevant processing device when the software is run. Correspondingly, the social networking application-based informational site establishment system may be arranged and installed on a corresponding machine device, or may also be a corresponding machine device itself. Herein, the machine device may be any terminal device, such as a mobile phone, a tablet computer, a personal digital assistant (PDA), or a vehicle-mounted computer.

Therefore, based on the solutions of the present application, the present application further provides a client device, and the client device or the social networking application server in the solutions of the present application may be arranged in the device. By using an application arranged on the client device as an example, the client device may be any device, such as a tablet computer, a PDA, a vehicle-mounted computer or a server, which can implement the solutions of the present application.

Figure 6:
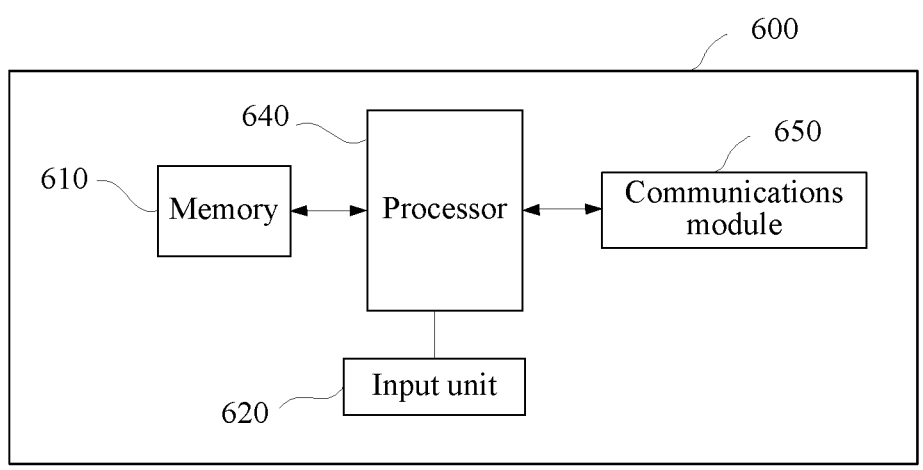
FIG. 6 is a block diagram of a partial structure of a client device in accordance with some embodiments of the present application.

FIG. 6 is a block diagram of a partial structure of the client device 600. Referring to FIG. 6, the device includes: a memory 610, an input unit 620, a processor 640, a communications module 650, and the like. Persons skilled in the art may understand that a structure shown in FIG. 6 is only a block diagram of a partial structure relevant to the solutions of the embodiments of the present application, and is not intended to limit the device applied to the solutions of the present application, and a specific client device may include components more or less than that shown in the figure, or combine some components, or have different component layouts.

The components of the client device 600 are described in detail with reference to FIG. 6.

The memory 610 may be used for storing a software program and a module, and a processor 640 executes various functional applications and data processing relevant to the device by operating the software program and the module that are stored in the memory 610. The memory 610 may mainly include a stored program area and a stored data area, where the stored program area may store an operating system, and an application program required for at least one function (such as a sound playback function or an image playback function); and the stored data area may store data created according to use of the device. In addition, the memory 610 may include a high-speed random access memory, and may further include a non-volatile memory, for example, at least one disk memory device, a flash memory device, or other volatile solid memory devices.

The input unit 620 may be used for receiving numbers, characters, or other information that are input, and generating keying signal input relevant to setting and function control of the device.

The device may implement communication with other devices by using the communications module 650, and the communications module 650 may be implemented by using any possible manner, such as a WiFi module, Bluetooth communication, optical fiber communication; communication between the device and other devices is implemented by using the communications module 650, so that the device can send relevant information to other devices (such as social networking application-based informational site template information, triggering information or a push message in the embodiments of the present application), and receive relevant information returned by other devices (such as an informational site establishment request, a push message or triggering information).

The processor 640 is a control center of the client device 600, which uses various interfaces and lines to connect all parts of the client device 600, and executes various functions and data processing of the device by operating or executing software programs and/or modules stored in the memory 610 and invoking data stored in the memory 610, thereby monitoring the device as a whole. Optionally, the processor 640 may include one or more processing units.

Figure 7:
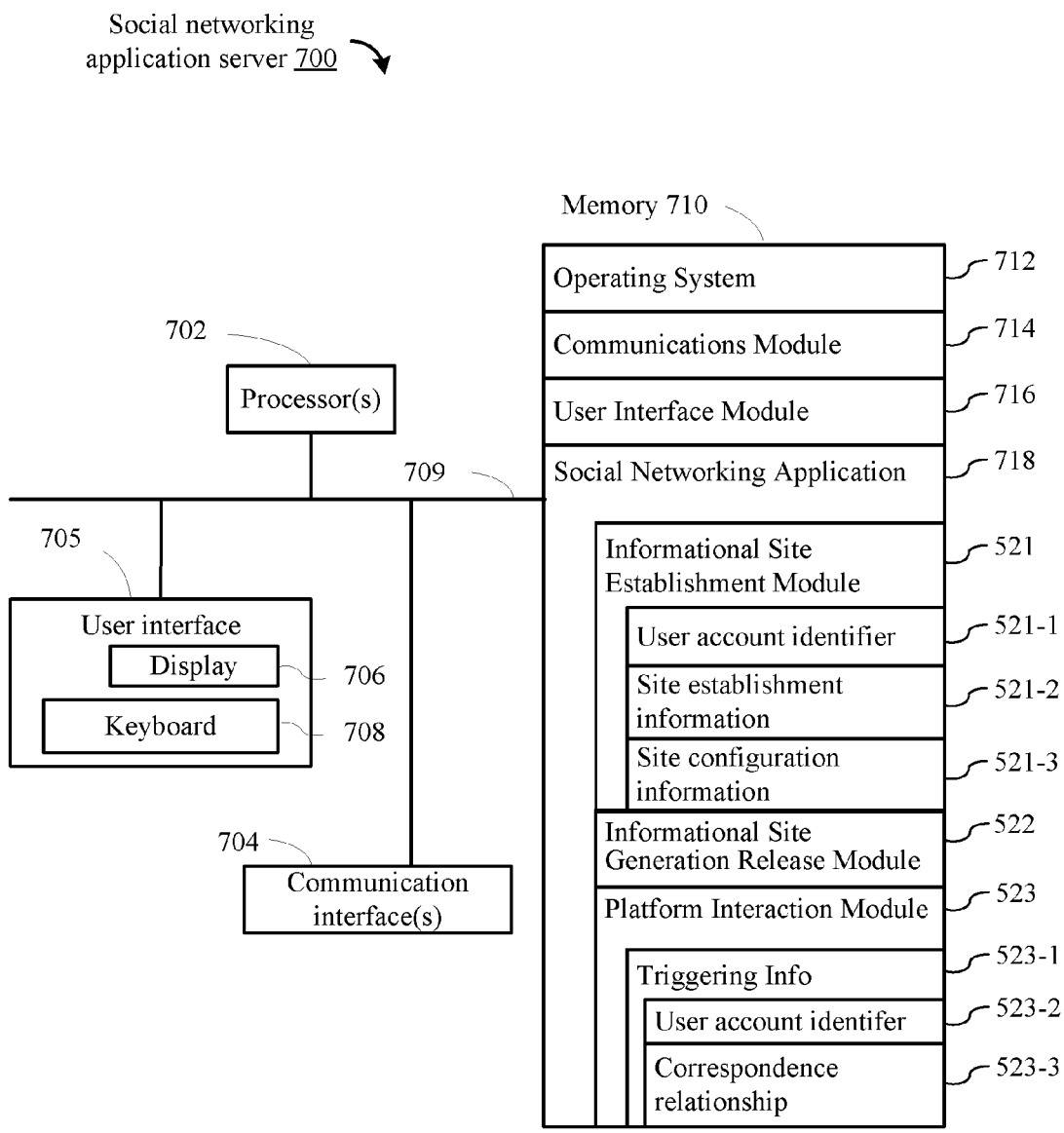
FIG. 7 is a block diagram illustrative of the components of a social networking application server shown in FIG. 5 in accordance with some embodiments.

FIG. 7 is a block diagram illustrative of the components of a social networking application server 700 shown in FIG. 5 in accordance with some embodiments. The social networking application server 700 typically includes one or more processors 702, one or more network or other communications interfaces 704, memory 710, and one or more communication buses 709 for interconnecting these components. The communication buses 709 may include circuitry (sometimes called a chipset) that interconnects and controls communications between system components. The social networking application server 700 may include a user input device 705, for instance, a display 706 and a keyboard 708. Memory 710 may include high speed random access memory and may also include non-volatile memory, such as one or more magnetic disk storage devices. Memory 710 may include mass storage that is remotely located from the processors 702. In some embodiments, memory 710, or alternately the non-volatile memory device(s) within memory 710, comprises a non-transitory computer readable storage medium. Memory 710 or the computer readable storage medium of memory 710 stores the following elements, or a subset of these elements, and may also include additional elements:

- an operating system 712 that includes procedures for handling various basic system services and for performing hardware dependent tasks;
- a network communication module 714 that is used for connecting the social networking application server 700 to a client device (e.g., a mobile phone) or other computers via one or more communication networks (wired or wireless), such as the Internet, other wide area networks, local area networks, metropolitan area networks, and so on;
- a user interface module 716 configured to receive user inputs through the user interface 705; and
- a social networking application 718 supporting the establishment of an informational site and the management of information exchanges between the informational site and its subscribing users from client devices; in some embodiments, the social networking application 718 further including:
  - an informational site establishment module 521, used for receiving and processing an informational site establishment request sent by a client device, where the informational site establishment request includes the social networking application account identifier 521-1 of the user of the client device and the informational site establishment information 521-2, and the informational site establishment information includes the site template information and the configuration information 521-3;
  - an informational site generation release module 522, used for establishing, according to the informational site establishment request, an informational site corresponding to a social networking application account identifier, and releasing the informational site to its subscribers; and
  - a platform interaction module 523, used for receiving triggering information 523-1 sent by the other client device via the social networking application server, where the triggering information 523-1 includes social networking application account identifier 523-2 of the other client device, and a correspondence relationship 523-3 between the social networking application account identifier of the user of the other client device and the informational site.

In the embodiments described above, only several implementation manners of the present application are described, and description thereof is specific and detailed, which, however, shall not be construed as a limitation to the patent scope of the present application. It should be noted that persons of ordinary skill in the art can further make several modifications and improvements without departing from the concept of the present application, which shall fall within the protection scope of the present application. Therefore, the protection scope of the present application shall be subjected to the attached claims.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of managing an informational site using a social networking application that has multiple users, each user having a unique social networking application account identifier, the method comprising:
    at a computer server having one or more processors and memory storing programs executed by the one or more processors,
    receiving, from a first client device, a site template viewing request;
    sending site template information to the first client device according to the site template viewing request, wherein the site template information includes a set of pre-designed site template configurations, each configuration having an associated service type;
    receiving an informational site establishment request from the first client device, the informational site establishment request including a social networking application account identifier of a user of the first client device;
    establishing, according to the informational site establishment request, an informational site corresponding to the social networking application account identifier;
    publishing a link to the informational site to users associated with a plurality of social networking application account identifiers of the social networking application to enable the users to access the informational site from their accounts of the social networking application;
    receiving triggering information sent by a user of a second client device, the triggering information including a social networking application account identifier of the user of the second client device and the published link to the informational site; and
    storing a correspondence relationship between the social networking application account identifier of the user of the second client device and the informational site.

2. The method of claim 1, wherein the informational site establishment request further includes site template information and site configuration information selected by the user of the first client device.

3. The method of claim 1, wherein the social networking application account identifier of the user of the second client device is not one of the plurality of social networking application account identifiers of the social networking application.

4. The method of claim 1, further comprising:
    receiving a push message sent by the user of the first client device, the push message defining criteria for identifying a set of social networking application account identifiers for receiving the push message; and
    sending the push message to a client device associated with one of the identified set of social networking application account identifiers of the social networking application in accordance with a correspondence relationship.

5. The method of claim 1, further comprising:
    after receiving the triggering information sent by the user of the second client device:
    generating a message log entry between the informational site and the user of the second client device for storing future communications between the user of the second client device and the informational site.

6. The method of claim 1, wherein the triggering information is one selected from the group consisting of a first-time following message, an automatic reply message, a keyword reply message, and a user-defined menu reply message.

7. A computer system for managing an informational site using a social networking application that has multiple users, the computer system comprising:

one or more processors;

memory; and one or more program modules stored in the memory and configured for execution by the one or more processors, the one or more programs including instructions for:

receiving, from a first client device, a site template viewing request;

sending site template information to the first client device according to the site template viewing request, wherein the site template information includes a set of pre-designed site template configurations, each configuration having an associated service type;

receiving an informational site establishment request from the first client device, the informational site establishment request including a social networking application account identifier of a user of the first client device;

establishing, according to the informational site establishment request, an informational site corresponding to the social networking application account identifier;

publishing a link to the informational site to users associated with a plurality of social networking application account identifiers of the social networking application to enable the users to access the informational site from their accounts of the social networking application;

receiving triggering information sent by a user of a second client device, the triggering information including a social networking application account identifier of the user of the second client device and the published link to the informational site; and storing a correspondence relationship between the social networking application account identifier of the user of the second client device and the informational site.

8. The computer system of claim 7, wherein the informational site establishment request further includes site template information and site configuration information selected by the user of the first client device.

9. The computer system of claim 7, wherein the social networking application account identifier of the user of the second client device is not one of the plurality of social networking application account identifiers of the social networking application.

10. The computer system of claim 7, wherein the one or more programs further include instructions for:

receiving a push message sent by the user of the first client device, the push message defining criteria for identifying a set of social networking application account identifiers for receiving the push message; and sending the push message to a client device associated with one of the identified set of social networking application account identifiers of the social networking application in accordance with a correspondence relationship.

11. The computer system of claim 7, wherein the one or more programs further include instructions for:

after receiving the triggering information sent by the user of the second client device:

generating a message log entry between the informational site and the user of the second client device for storing future communications between the user of the second client device and the informational site.

12. The computer system of claim 7, wherein the triggering information is one selected from the group consisting of a first-time following message, an automatic reply message, a keyword reply message, and a user-defined menu reply message.

13. A non-transitory computer readable storage medium, storing one or more programs for execution by one or more processors of a computer system for managing an informational site using a social networking application that has multiple users, the one or more programs including instructions for:

receiving, from a first client device, a site template viewing request;

sending site template information to the first client device according to the site template viewing request, wherein the site template information includes a set of pre-designed site template configurations, each configuration having an associated service type;

receiving an informational site establishment request from the first client device, the informational site establishment request including a social networking application account identifier of a user of the first client device;

establishing, according to the informational site establishment request, an informational site corresponding to the social networking application account identifier;

publishing a link to the informational site to users associated with a plurality of social networking application account identifiers of the social networking application to enable the users to access the informational site from their accounts of the social networking application;

receiving triggering information sent by a user of a second client device, the triggering information including a social networking application account identifier of the user of the second client device and the published link to the informational site; and storing a correspondence relationship between the social networking application account identifier of the user of the second client device and the informational site.

14. The non-transitory computer readable storage medium of claim 13, wherein the informational site establishment request further includes site template information and site configuration information selected by the user of the first client device.

15. The non-transitory computer readable storage medium of claim 13, wherein the social networking application account identifier of the user of the second client device is not one of the plurality of social networking application account identifiers of the social networking application.

16. The non-transitory computer readable storage medium of claim 13, wherein the one or more programs further include instructions for:

receiving a push message sent by the user of the first client device, the push message defining criteria for identifying a set of social networking application account identifiers for receiving the push message; and sending the push message to a client device associated with one of the identified set of social networking application account identifiers of the social networking application in accordance with a correspondence relationship.

17. The non-transitory computer readable storage medium of claim 13, wherein the one or more programs further include instructions for:

after receiving the triggering information sent by the user of the second client device:

generating a message log entry between the informational site and the user of the second client device for storing future communications between the user of the second client device and the informational site.

18. The non-transitory computer readable storage medium of claim 13, wherein the triggering information is one selected from the group consisting of a first-time following message, an automatic reply message, a keyword reply message, and a user-defined menu reply message.

* * * * *